Sept. 14, 1943.　　　　A. K. HINCHMAN　　　　2,329,371
MIXING VALVE
Filed Feb. 27, 1942　　　　4 Sheets-Sheet 1
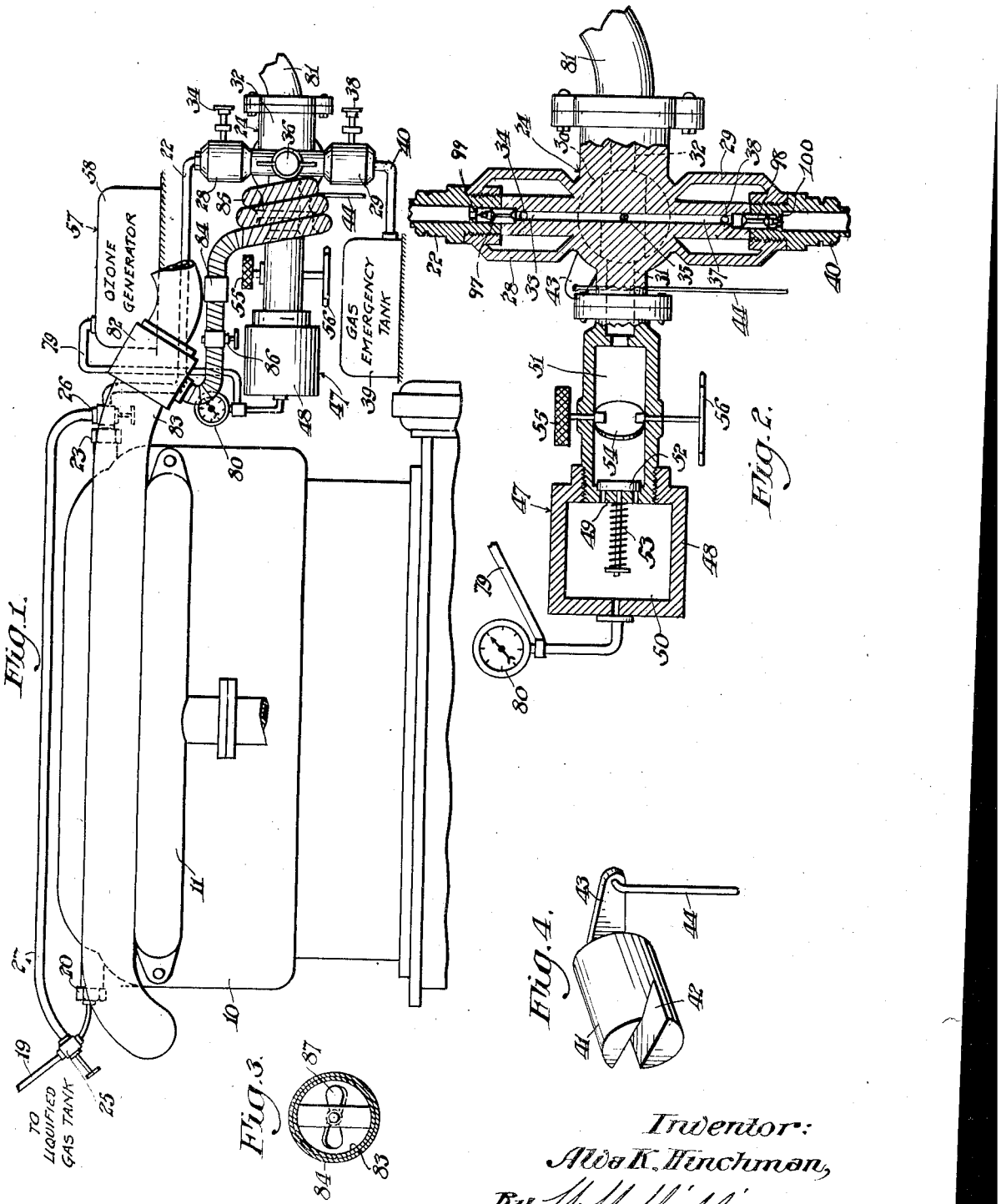
Inventor:
Alda K. Hinchman,
By W. B. Williamson
Attorney.

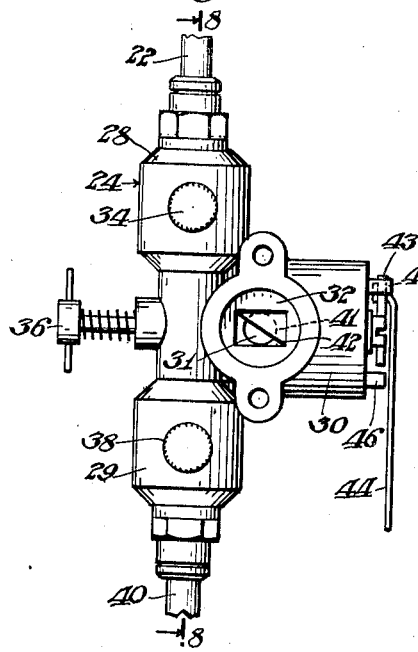
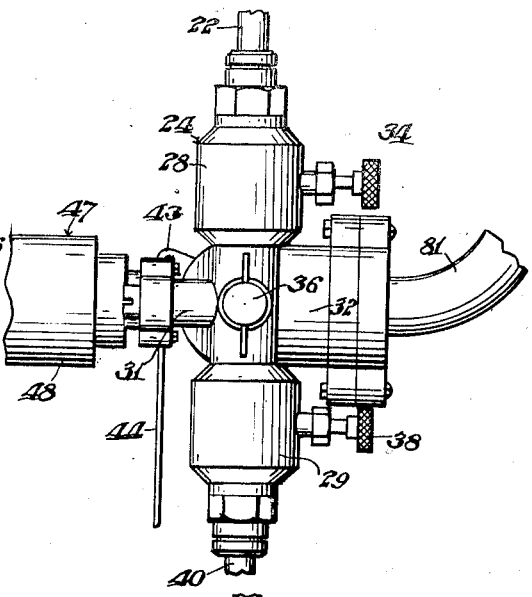
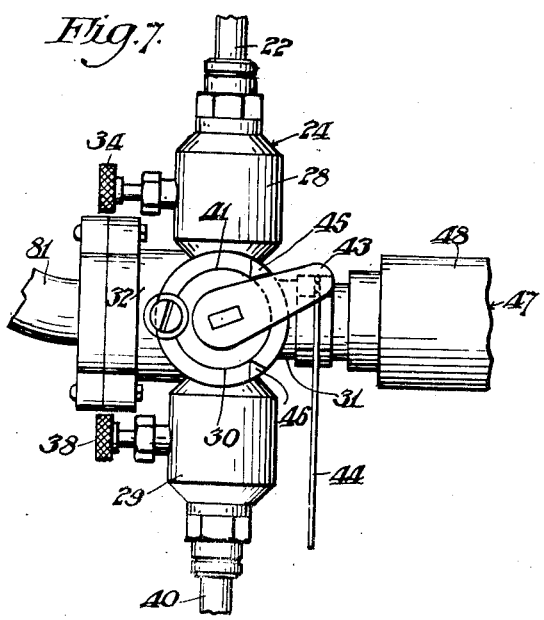
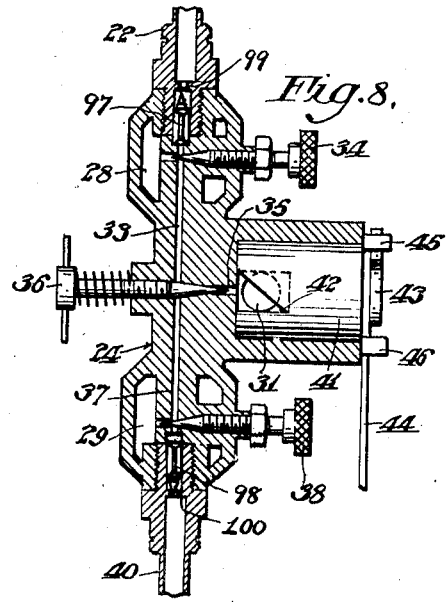

Sept. 14, 1943.  A. K. HINCHMAN  2,329,371
MIXING VALVE
Filed Feb. 27, 1942  4 Sheets-Sheet 3
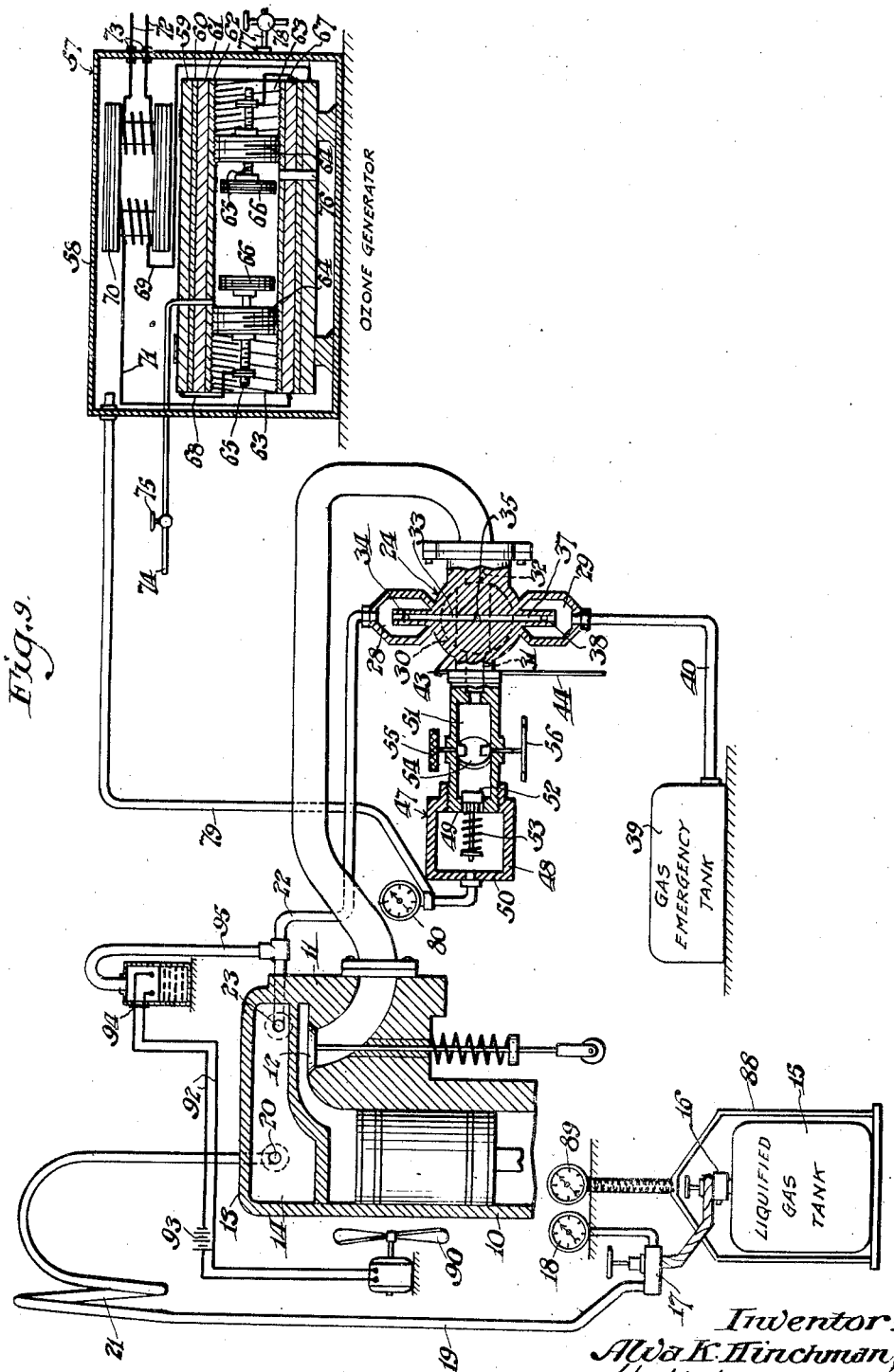
Inventor:
Alva K. Hinchman,
By W. W. Williamson
Attorney.

Patented Sept. 14, 1943

2,329,371

UNITED STATES PATENT OFFICE 2,329,371

MIXING VALVE

Alva K. Hinchman, Bryn Mawr, Pa., assignor to Ozone Gas Combustion Co., Inc., a corporation of Delaware Application February 27, 1942, Serial No. 432,564

3 Claims. (Cl. 48—180)

My invention relates to a new and useful mixing valve.

This application is a continuation in part from my application Ser. No. 397,674, filed June 12, 1941, which has eventuated in Patent No. 2,324,392, July 13, 1943, and particularly relates to a mixing valve constituting a part of the original application.

One object of the present invention is to mix ozone with liquified gas to produce a highly explosive engine fuel having a high octane rating, which fuel is inexpensive to produce and has little or no decomposing effect on the engine lubricating oil.

Another object of this invention is to provide an unique mixing valve for introducing ozone into the liquified gas and for feeding the resultant fuel to an internal combustion engine.

With the above and other objects in view, this invention consists of certain details of construction and combintaion of elements hereinafter set forth and then designated by the claims.

In order that those skilled in the art to which this invention appertains may understand how to make and use the same, I will describe its construction, referring by numerals to the accompanying drawings forming a part hereof, in which:

Fig. 1 is a view of the apparatus constituting one part of my invention, the relation of the several elements to one another being illustrated diagrammatically.

Fig. 2 is an enlarged sectional view of the mixing valve and control valve unit.

Fig. 3 is an enlarged cross sectional view of the hot air pipe to illustrate the fan therein.

Fig. 4 is a perspective view of the rotary valve plug or throttle.

Fig. 5 is a side elevation of the mixing valve.

Fig. 6 is a view thereof looking at it from the left hand side of Fig. 5.

Fig. 7 is a view of the same valve looking at it from the right hand side of Fig. 5.

Fig. 8 is a section on the line 8—8 of Fig. 5.

Fig. 9 is a diagrammatic view of the apparatus with the addition of the indicating means to show the amount of liquified gas supply and the thermostatically controlled fan.

Figure 10:
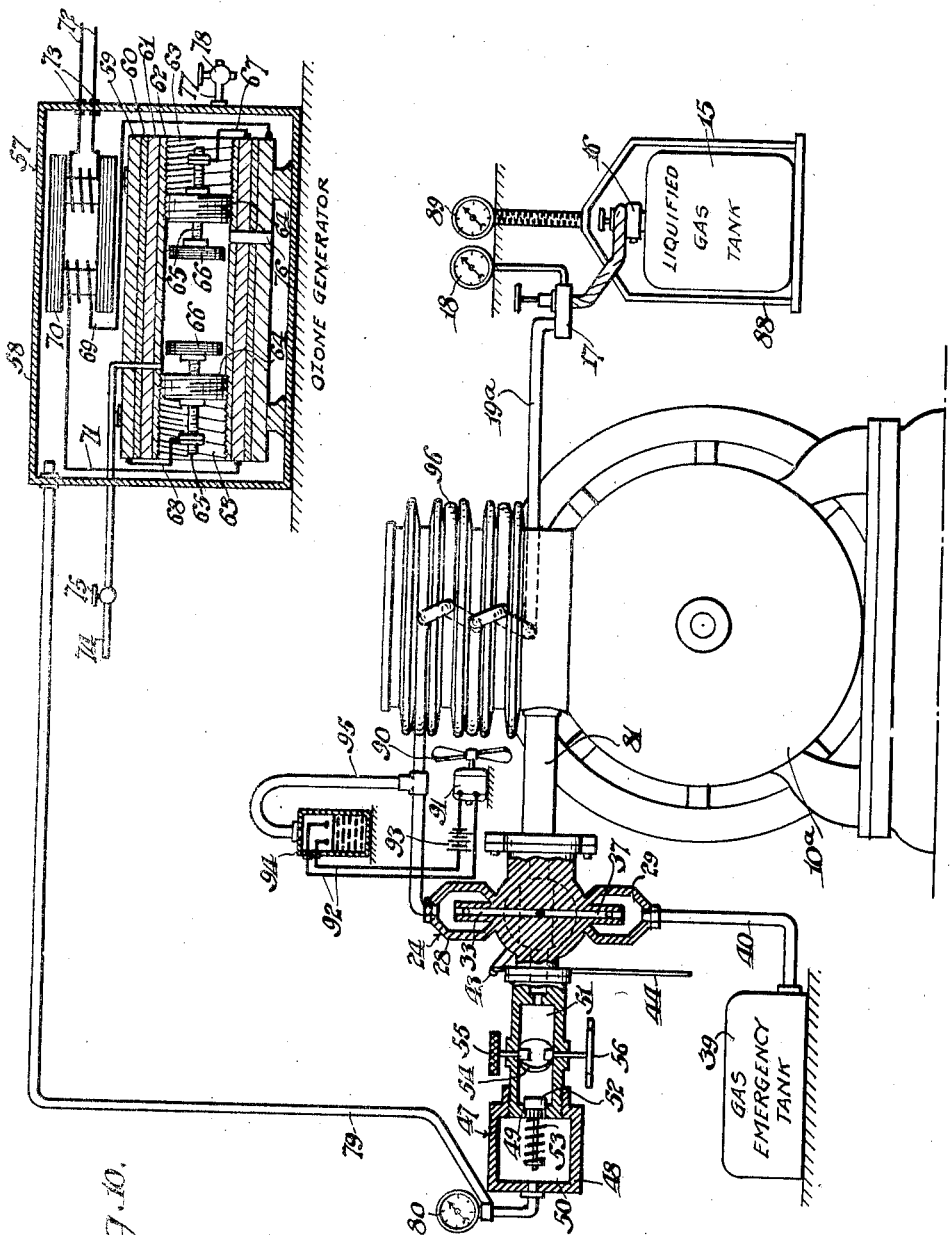
Fig. 10 is a view in which some of the elements are illustrated in elevation and others in section and the relation of such elements being shown diagrammatically.

In carrying out my invention as herein embodied 10 represents an internal combustion engine of one or more cylinders to which may lead the usual intake manifold 11 or other suitable inlet. The intake of each cylinder is controlled by the usual intake valve 12. Arranged about the cylinder or cylinders is a jacket 13 providing a cooling chamber 14.

A source of liquified gas, such as propane, is provided which may be a tank or other receptacle 15 having a regulator or valve 16 at the outlet, which valve is connected with a pressure regulator 17 to which is attached a pressure gage 18. From the pressure regulator leads a suitable conduit 19 to an inlet 20 to the cooling chamber 14 and said conduit should be of considerable length, but in order to save space of installation said conduit may have a coil 21 formed therein. Another conduit 22 leads from the outlet 23 of the cooling chamber 14 to the mixing valve 24. In order that the liquified gas may be by-passed around the cooling chamber a valve 25 is interposed in the conduit 19 and preferably a similar valve 26 is interposed in the conduit 22 and said valves have a by-pass conduit 27 between them.

The mixing valve 24 comprises a body having at least one expansion chamber 28 with which the conduit 22 is connected, and preferably includes a second expansion chamber 29 in opposed relation to the first mentioned one. Offset to one side is a throttle chamber 30 to and from which lead the opposed inlet and outlet ports 31 and 32 respectively, each of which has a rectangular portion, preferably oblong, at their points of communication with the throttle chamber 30 as shown in Figs. 5 and 8.

A duct 33, controlled by an auxiliary needle valve 34, leads from the expansion chamber 28 to a cross duct 35 which in turn leads to the axial center of the throttle chamber 30 and said cross-duct is controlled by the master needle valve 36. Where a second expansion chamber 29 is provided, such chamber has a duct 37 leading therefrom to the cross-duct 35 and said duct is controlled by an auxiliary needle valve 38.

The second expansion chamber 29 is to provide for connection with an emergency supply of gas which may be ordinary gasoline. To this end a tank or other suitable receptacle 39 is conveniently located and a conduit 40 leads directly from the receptacle 39 to the expansion chamber 29.

In the throttle chamber 30 is rotatably mounted the cylindrical throttle valve 41, Fig. 4, having a V or wedge shaped aperture 42 extending into the body thereof from the inner end. This aperture 42 extends all the way across the throttle valve body and one of the surfaces forming it is in a plane parallel to the axis while the other surface is oblique to the first mentioned one. When the valve 41 is rotated to cause the oblique line to traverse the oblong portion of the outlet 32 said outlet will be gradually opened or closed as the case may be. Said throttle valve 41 may be rotated in any convenient manner but for purposes of illustration it is shown as provided with a lever 43 on its outer end to which may be attached a pull rod or wire 44 for actuating the valve from remote locations. The movements of the lever and consequently the valve are limited by the stops 45 and 46 which may be lugs on the valve casing.

To the inlet side 31 of the mixing valve is connected the outlet of the ozone control valve 47 and form a unit with the mixing valve. This ozone control valve includes a housing 48 within which is an apertured partition 49 functioning as a valve seat and also dividing the interior of the housing into two compartments 50 and 51.

A poppet valve 52 cooperates with the apertured partition or valve seat and has a stem projecting through and slidably mounted in said partition. A spring 53 urges the poppet valve towards a closed position in opposition to suction caused by operation of the engine. In compartment 51 is a butterfly valve 54 having an operating member 55 on the outside of the housing and may also have an indicator or pointer 56 to show at all times the position of said butterfly valve.

An ozone generator 57 is conveniently located relative to the balance of the apparatus and includes a suitable airtight sealed casing or container 58. Within this casing is an outer tubular electrode 59 containing a snugly fitting insulating sleeve 60 of glass or other suitable material, such as "Pyrex."

Within said sleeve 60 is snugly fitted an inner tubular electrode 61 and snugly fitting inside of said inner electrode is an insulating sleeve 62 which may also be of glass or some other suitable material and internal threads 63 are provided at both ends thereof. In the present disclosure, sleeve 62 is made of "Pyrex."

Screwed into each end of the insulating sleeve 62 is an insulated stuffing box 64 which is exteriorly threaded for this purpose and permits limited longitudinal adjustment of the stuffing box within the sleeve 62.

An exteriorly threaded rod 65 projects through each stuffing box and has threaded connection with the latter to provide for longitudinal adjustment thereof. On the inner end of each rod is a head 66 of slightly smaller diameter than the interior diameter of the sleeve 62 so that the circumference of said head is spaced from the inner surface of said sleeve 62. Each threaded rod and its head forms a high tension electrode.

A conductor 67 is connected to the inner tubular electrode 61 at one end thereof and to the adjacent high tension electrode, and another conductor 68 is connected to the outer electrode 59 and its adjacent or other high tension electrode.

Another conductor 69 connects one end of the outer electrode 59 with the secondary side of the transformer 70 and still another conductor 71 connects the opposite end of the inner electrode 61 with said secondary side of the transformer 70. The primary side of the transformer is connected by line conductors 72 with a source of electrical energy and said conductors 72 pass through airtight insulators 73 in one wall of the casing or container 57.

An air inlet 74 leads from the exterior of the casing or container 57 and passes through the tubular electrodes 59 and 61 and their insulating sleeves 60 and 62 to a location inside of the inner insulating sleeve 62 between the two stuffing boxes 64, and said air inlet 74 has a suitable air controlling valve 75 interposed therein at any convenient location outside of the casing 57.

Leading from the space within the inner insulating sleeve 62 between the two stuffing boxes and at a distance from the point of entrance of the air inlet 74, is an ozone outlet 76 passing through the tubular electrodes and their insulating sleeves and communicating with the interior of the casing 57. In order to provide means for permitting air to enter the casing or container 57 for mixture with the produced ozone, I provide a secondary or auxiliary air inlet or intake 77 leading only to the interior of said casing or container 57 and said secondary air inlet or intake is controlled by a cock or valve 78.

The interior of the casing or container 57 is in communication with the chamber 50 of the ozone controlling valve 47 through a conduit 79 which may be provided with a pressure gage 80. When the ozone passes through the controlling valve 47 and enters the mixing valve 24, said ozone will mix with and enrich the gas also entering the mixing valve and the fuel thus formed will be drawn from said mixing valve through the conduit 81 to the intake or intakes or intake manifold of the engine 10, by vacuum on the engine side and compression on the fuel side of the intake.

It is advisable, under some conditions, as when operating an engine at high altitudes, such as in the stratosphere, to raise the temperature of the ozone just before entering the mixing valve. This may be accomplished in any suitable or desirable manner, and for convenience of illustration only, I show in Fig. 1 a hot air drum 82 connected with a source of heat, for example, the exhaust 83 of the engine. A hot air pipe 84 runs from said drum 82 to a stove 85 comprising coils of said pipe, a chamber formed by a jacket on the ozone controlling valve 47 or other equivalent means. Of course this heat exchange device can be a part of the inlet structure 31 of the mixing valve or part of both the controlling and mixing valves.

When the heat is not needed it may be shut off by a damper or valve 86 interposed in the pipe 84. In order to agitate the hot air passing through the pipe and keep an even flow thereof, a fan 87, Fig. 3, is installed in said pipe between the damper 86 and the stove or heat exchange element 85. This fan is particularly advantageous where the exhaust products pass directly through the pipe 84 as a by-pass of the exhaust outlet.

In practice, the operation of the apparatus is as follows:—An electric current is caused to flow through the primary of the transformer 70 and thereafter the secondary or high tension induced current feeds into the tubular electrodes 59 and 61 and thence to the high tension electrodes and this high tension current passes from one high tension electrode to the other. During the operation of the electrical portion of the apparatus as above described, air or oxygen, preferably the former, is permitted to flow through the inlet 74 into the chamber formed by the inner insulating sleeve 62 and the stuffing boxes, where it is acted upon by the high tension current and converted into ozone which then flows through the outlet 76 into the interior of the casing 57 from where it flows, in due course, through the conduit 79 into the chamber 50 of the ozone controlling valve 47.

At the same time liquified gas is permitted to flow from the receptacle 15 through the conduit 19 and either through the engine cooling chamber 14 or through the by-pass 27 to the conduit 22 into the mixing chamber 28 of the mixing valve 24. Where this liquified gas passes through the cooling chamber of the engine, the movement and expansion of said gas will cause its temperature to drop considerably and cool the engine without relying upon the use of the ordinary water cooling systems but a stream of air may be used to dissipate heat as will be later described. Under some conditions gas from the emergency tank 39 may be allowed to flow through the conduit 40 to the mixing chamber 29 of the mixing valve 24.

In any case, with the valves properly set, when the engine piston is on its suction stroke a suction action is created in the conduit 81 and the throttle valve chamber 30 back to the chamber 51 of the ozone controlling valve 47 thus drawing a charge of ozone from the chamber 50. As the ozone passes through the throttle valve chamber it is mixed with gas ejected through the duct 35 into said throttle valve chamber. The flow of the fuel thus produced is controlled by the throttle valve 41 for retarding or accelerating the engine.

In order that the operator may, at all times, be aware of the amount of liquified gas on hand in the tank or receptacle 15, the latter is supported on a suitable weighing device or scale 88, Figs. 9 and 10, including an indicator 89 in easy access to the operator whereby said operator may readily observe the indicator reading. The indicator 89 should be of the type that registers zero for the weight of the container 15, which weight is a known quantity, or one that can be adjusted to zero for tare should containers of this kind vary in weight. Under these conditions, when a full container is placed on the weighing device, the weight of the liquified gas will be indicated and as said gas is used the indicator will gradually return to zero thus showing how the gas is dispensed and finally indicating when the container is empty.

It is also advisable, under some conditions, to maintain the liquified gas at a substantially even temperature as it enters the mixing valve 24. This is accomplished by causing a stream of air to flow about the engine or over a portion of the gas conduit or both. For convenience of illustration I have shown the temperature regulator, Figs. 9 and 10, as including a fan 90 actuated by an electric motor 91. Suitable conductors 92 are connected to a source of electricity 93 and with the motor 91 and a thermostat 94 which in turn is connected, as by a tube 95, with the warm side of the gas conduit leading to the chamber 28 of the mixing valve 24. By this arrangement should the liquified gas reach a point above a predetermined or preselected degree of temperature the thermostat will close the circuit of the motor 91 and cause the fan to force a stream of air about the engine or the gas conduit or both and thereby reduce the temperature of the liquified gas prior to entering the mixing valve 24.

Where the apparatus is used in connection with an air cooled engine 10a, as shown in Fig. 10, the liquefied gas conduit 19a, which leads directly to the chamber 28 of the mixing valve 24, may be wound about the engine cylinder between the heat radiating fins to form heat exchange coils 96 as a substitute for the cooling chamber 14 shown in Figs. 1 and 9.

From the foregoing it will be apparent that should the temperature of the gas rise above a predetermined or preselected degree, the thermostat 94, Figs. 9 and 10, will close the electrical circuit through the fan motor and cause the fan to propel a current of air about the engine which will assist in maintaining the gas at the desired temperature and while said desired temperature is maintained the thermostat will keep the fan motor circuit open so the fan will be inoperative.

In the arrangement particularly illustrated in Fig. 10, the heat exchange coils 96 formed in the gas conduit 19a and surrounding the engine assist in reducing the temperature of said engine and raising the temperature of the gas flowing through said conduit 19a. Should the temperature of the gas rise above a predetermined or preselected degree the fan 90 will be operated, as before described, and when the temperature is reduced sufficiently, the fan will be stopped.

In order to prevent a retrograde flow of the gases, check valves 97 and 98 may be located between the respective inlets, provided by the conduits 22 and 40, and the expansion chamber 28 and 29, said check valves coacting with the respective seats 99 and 100.

Of course I do not wish to be limited to the exact details of construction herein shown and described as these may be varied within the scope of the appended claims without departing from the spirit of my invention.

Having described my invention what I claim as new and useful is:

1. A mixing valve comprising a housing having an expansion chamber therein to which leads an inlet, a valve controlled outlet duct leading from said expansion chamber, a throttle valve chamber offset relative to the expansion chamber and said outlet duct having an inlet and outlet, a valve controlled cross-duct communicating with the first mentioned duct and the throttle valve chamber, and a throttle valve rotatably mounted in said throttle valve chamber and having a wedge shaped notch in its inner end constantly in communication with the cross-duct and movable across the inlet and outlet of the throttle chamber.

2. The structure in claim 1 wherein the mixing valve housing has a second expansion chamber in opposed relation to the other one, said second expansion chamber having a valve controlled outlet duct leading to the cross-duct.

3. A valve unit consisting of a mixing valve comprising a housing having an expansion chamber to which leads a gas inlet, a throttle valve chamber offset relative to the expansion chamber and having an inlet and outlet, an outlet duct leading from the expansion chamber, a needle valve to control said duct, a cross-duct leading from said outlet duct to the throttle valve chamber, a needle valve to control said cross-duct, a throttle having a wedge shaped notch in its inner end, said throttle rotatably mounted in the throttle chamber to control the inlet and outlet of said throttle chamber and the notch being in constant communication with the cross-duct, an ozone controlling valve housing having an inlet and outlet, the latter connected to the inlet of the throttle valve chamber, an apertured partition dividing the controlling valve housing into two compartments, a spring operated poppet valve normally closing the aperture in the partition, and a damper valve between the poppet valve and the outlet of the controlling valve housing.

ALVA K. HINCHMAN.